(12) United States Patent
Kajimoto

(10) Patent No.: US 8,388,069 B2
(45) Date of Patent: Mar. 5, 2013

(54) AUTOMOBILE SEAT AND HEADREST THEREOF

(75) Inventor: Kazuhiro Kajimoto, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 317 days.

(21) Appl. No.: 12/725,694

(22) Filed: Mar. 17, 2010

(65) Prior Publication Data

US 2010/0244526 A1    Sep. 30, 2010

(30) Foreign Application Priority Data

Mar. 24, 2009    (JP) .................................. 2009-071896

(51) Int. Cl.
    *A47C 7/36* (2006.01)
(52) U.S. Cl. ............................ 297/408; 297/61; 297/410
(58) Field of Classification Search .................. 297/408, 297/61, 410
    See application file for complete search history.

(56) References Cited

U.S. PATENT DOCUMENTS

| 7,008,019 | B2 * | 3/2006 | Lampke et al. ............... 297/408 |
| 7,044,555 | B2 * | 5/2006 | Saberan ........................ 297/408 |
| 7,059,681 | B2 * | 6/2006 | Kubo ............................. 297/410 |
| 7,517,009 | B2 * | 4/2009 | Mauro et al. .............. 297/408 X |

FOREIGN PATENT DOCUMENTS

JP    11-180197    7/1999

* cited by examiner

*Primary Examiner* — Anthony D Barfield
(74) *Attorney, Agent, or Firm* — Gerald E. Hespos; Michael J. Porco; Matthew T. Hespos

(57) ABSTRACT

A headrest for an automobile seat has a headrest body and an attachment member to be attached to a back of the seat to allow the headrest body to be moved up and down with respect to the seat back in a standing posture, while allowing the headrest body to be rotated about a pivot shaft to move a lower end of the headrest body in a frontward-rearward direction of the automobile. The headrest body has an expanded rear portion thereof to expand rearwardly and configured so that a distance between the surface of the expanded portion and the pivot shaft gradually decreases toward an upper edge of the expanded portion. The expanded portion is opposed to an upper surface of the seat back in the standing posture and contacts the upper surface when the attachment member is moved down.

8 Claims, 4 Drawing Sheets

AUTOMOBILE SEAT AND HEADREST THEREOF

BACKGROUND OF THE INVENTION

1. Field of the Invention

The present invention relates to an automobile seat and a headrest thereof.

2. Description of the Related Art

Heretofore, a headrest has been provided on a seat back of an automobile seat to protect a user or an occupant seated in the seat in the event of a collision. As an example of the conventional headrest, there has been known a type capable of being moved upwardly and downwardly with respect to a seat back in a standing posture which is a normal usage position. This type of headrest can be moved downwardly with respect to the seat back so as to be set to a lower position (when the seat back is in the standing posture) in advance of an operation of rotating the seat back frontwardly to set the seat back to a frontwardly tilted posture. This makes it possible to prevent a problem, such as a situation where the headrest disturbs the operation of setting the seat back to the frontwardly tilted posture.

However, in this case, even when a user leans on the seat back in the standing posture during traveling of the automobile, the headrest is likely to be used under a condition that it is still set in the lower position after being moved downwardly with respect to the seat back. If the headrest is used in the lower position, it cannot fulfill its original protective function.

As means for solving this problem, there has been known a technique proposed, for example, in JP 11-180197A. In this technique, an automobile seat comprises a lock device and a restriction device. The lock device is adapted to selectively lock a standing posture of a seat back and release the locked state. The restriction device is adapted, when the seat back is locked in the standing posture by the lock device, to inhibit a headrest from being moved downwardly to a position equal to or lower than a given position, and, when the headrest is in a position equal to or lower than the given position, to inhibit the lock device from locking the standing posture of the seat back.

However, as in the technique disclosed in JP 11-180197A, if a downward movement of the headrest is constantly inhibited by the restriction device when the seat back is in the standing posture, the headrest cannot be moved downwardly as long as the seat back is in the standing posture, for example, even in a situation where a user wants to move the headrest downwardly during stopping of the automobile. Thus, the user is obliged to perform an operation of moving the headrest downwardly after setting the seat back to a frontwardly tilted posture, so that the operation is liable to become cumbersome. Moreover, the seat provided with the restriction device becomes structurally complicated to cause an increase in cost.

SUMMARY OF THE INVENTION

It is an object of the present invention to provide an automobile seat headrest and an automobile seat capable of allowing a user to move a headrest body even when a seat back is set in a standing posture, and urging a user to set the headrest body to a functional position when the user leans on the seat back during traveling of the automobile.

It is another object of the present invention to provide an automobile seat headrest and an automobile seat capable of being structurally simplified and produced at a low cost.

In order to achieve the above objects, according to a first aspect of the present invention, there is provided a headrest to be attached to a seat back of a seat for an automobile. The head rest comprises a headrest body, and an attachment member adapted to be attached to the seat back to allow the headrest body to be moved in an upward-downward direction with respect to the seat back in a standing posture while allowing the headrest body to be rotated about a pivot shaft provided on the attachment member so as to move a lower end of the headrest body in a frontward-rearward direction of the automobile, wherein the headrest body has an expanded portion formed on a rear portion thereof to expand rearwardly and configured such that a distance between a surface of the expanded portion and the pivot shaft gradually decreases toward an upper edge of the expanded portion, and wherein the headrest body is adapted to be disposed to allow the expanded portion to be opposed to an upper surface of the seat back in the standing posture and to be brought into contact with the upper surface when the attachment member is moved downwardly.

According to a second aspect of the present invention, there is provided a seat for an automobile, which comprises a seat cushion, a seat back rotatably coupled to the seat cushion, and a headrest attached to the seat back, wherein the headrest includes a headrest body, and an attachment member attached to the seat back to allow the headrest body to be moved in an upward-downward direction with respect to the seat back in a standing posture while allowing the headrest body to be rotated about a pivot shaft provided on the attachment member so as to move a lower end of the headrest body in a frontward-rearward direction of the automobile, and wherein the headrest body has an expanded portion formed on a rear portion thereof to expand rearwardly and configured such that a distance between a surface of the expanded portion and the pivot shaft gradually decreases toward an upper edge of the expanded portion, and wherein the expanded portion is arranged to be opposed to an upper surface of the seat back in the standing posture, and brought into contact with the upper surface when the attachment member is moved downwardly.

DETAILED DESCRIPTION OF THE PREFERRED EMBODIMENTS

Figure 1:
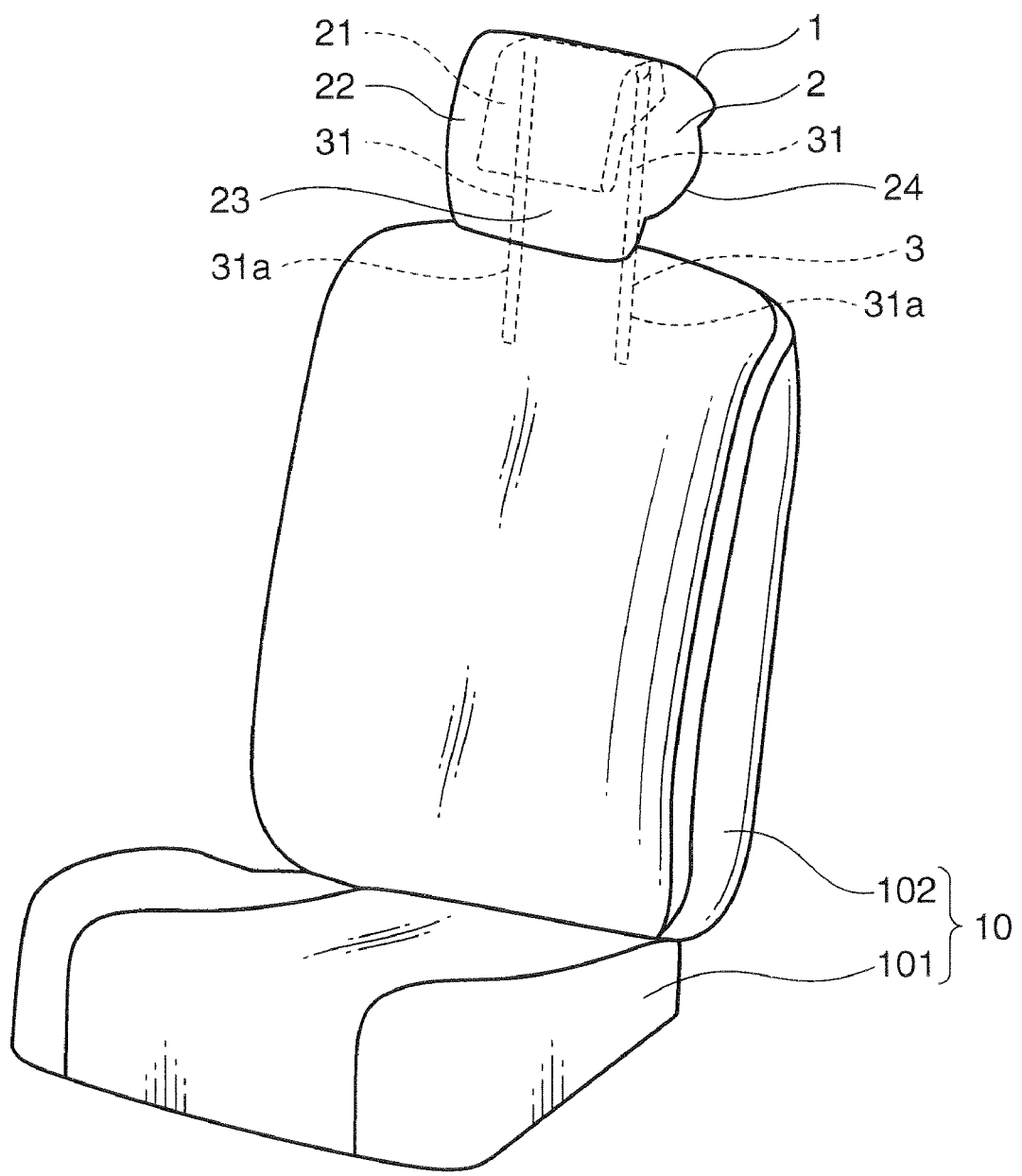
FIG. 1 is a perspective view of an automobile seat provided with a headrest according to one embodiment of the present invention.

With reference to the drawings, the present invention will now be specifically described based on an embodiment thereof. FIG. 1 is a perspective view of an automobile seat equipped with a headrest according to one embodiment of the present invention.

An automobile seat headrest 1 (hereinafter referred to as simply as "headrest 1") according to one embodiment of the present invention is designed to be used under a condition that it is attached to a seat back 102 of an automobile seat 10. As shown in FIG. 1, the automobile seat 10 according to this embodiment comprises a seat cushion 101, a seat back 102 rotatably coupled to a rear end of the seat cushion 101 in a frontward-rearward direction of the automobile, and the head rest 1 movably attached to the seat back 102. The seat back 102 is adapted to be rotatable with respect to the seat cushion 101 to take a frontwardly tilted posture (not shown) where it is tilted frontwardly toward the seat cushion 101, and a standing posture (see FIGS. 1 to 4) where it is raised from the frontwardly tilted posture.

The headrest 1 comprises a headrest body 2, and an attachment member 3 for attaching the headrest body 2 to the seat back 102.

Figure 2:
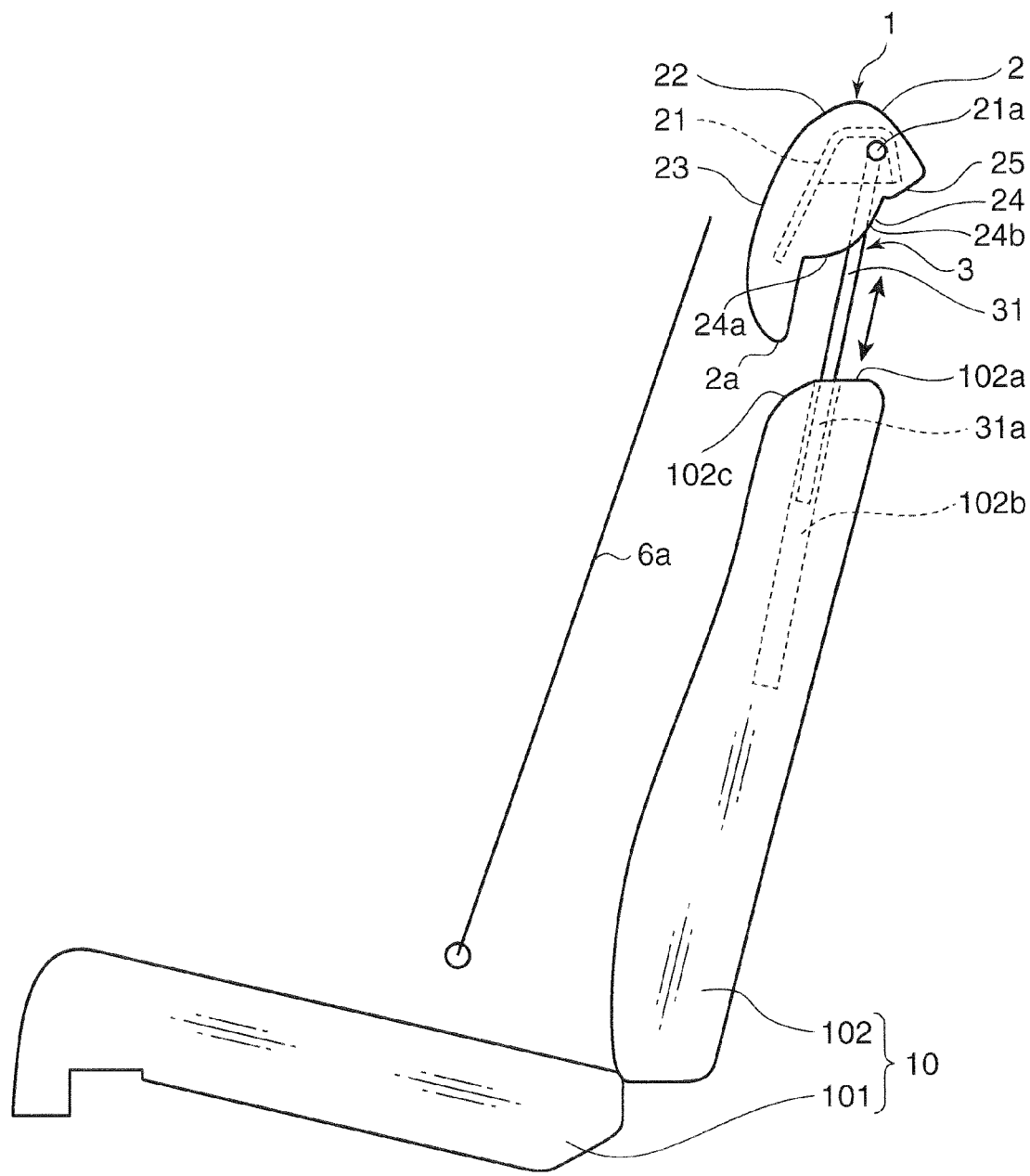
FIG. 2 is a side view of the automobile seat provided with the headrest according to the embodiment.

As shown in FIGS. 1 and 2, the headrest body 2 is formed by covering a core member 21 made of a metal, with a resilient cover member 22. The core member 21 is pivotally supported by an upper end (first end) of the attachment member 3. Specifically, a pivot shaft 21a provided at the upper end of the attachment member 3 to extend horizontally in a widthwise direction of the seat 10, and the core member 21 (the headrest body 2) is adapted to be rotated about the pivot shaft 21a of the attachment member 3.

The headrest body 2 has a head contact portion 23 formed on a front portion thereof to come into contact with a head of a seated occupant or a user. Further, the headrest body 2 has an expanded portion 24 formed on a rear portion thereof to expand rearwardly and obliquely downwardly to have an arc shape (curved shape). The expanded portion 24 includes a lower surface 24a adapted to be oriented downwardly when the surface of the head contact portion 23 is oriented frontwardly, and a rear inclined surface 24b continuously extending from the lower surface 24a while curving rearwardly and upwardly.

The headrest body 2 further has a rotation stopper portion 25 formed on upper rear side of the expanded portion 24 to stop the rotation of the headrest body 2 with respect to the attachment member 3 so as to restrict the rotation within a given range. Each of the rotation stopper portion 25 and the expanded portion 24 is located below the pivot shaft 21a. The expanded portion 24 is configured such that a contact position between with the expanded portion 24 and the seat back 102 is located frontwardly relative to the pivot shaft 21a when the seat back 102 is in the standing posture. Further, the expanded portion 24 are configured such that a distance between the pivot shaft 21a and each of the lower surface 24b and the rear inclined surface 24b gradually decreases toward an upper edge (or a rear edge) of the expanded portion 24.

The attachment member 3 comprises a pair of rod members 31 made of a metal and arranged in parallel to each other. A lower end (second end) of each of the rod members 31 forms a seat back-mounted portion 31a adapted to be movably mounted into the seat back 102.

The seat back 102 has a pair of insertion holes 102b formed to extend downwardly from an upper (in the standing posture) surface 102a thereof to a given depth. Each of the seat back-mounted portions 31a is inserted into a respective one of the insertion holes 102b of the seat back 102 in a movable manner along an axial direction thereof. In a state after the seat back-mounted portions 31a are inserted into respective ones of the insertion holes 102b, the surface of the head contact portion 23 of the headrest body 2 is oriented frontwardly. In this state, the surface of the expanded portion 24 is opposed to a front end 102c of the upper surface 102a of the seat back 102 and a vicinity of the front end 102c. Further, the headrest body 2 can be rotated about the pivot shaft 21a frontwardly from the above position. If the headrest body 2 is rotated about the pivot shaft 21a, a lower end 2a of the headrest body 2 will be moved in the frontward-rearward direction.

Figure 3:
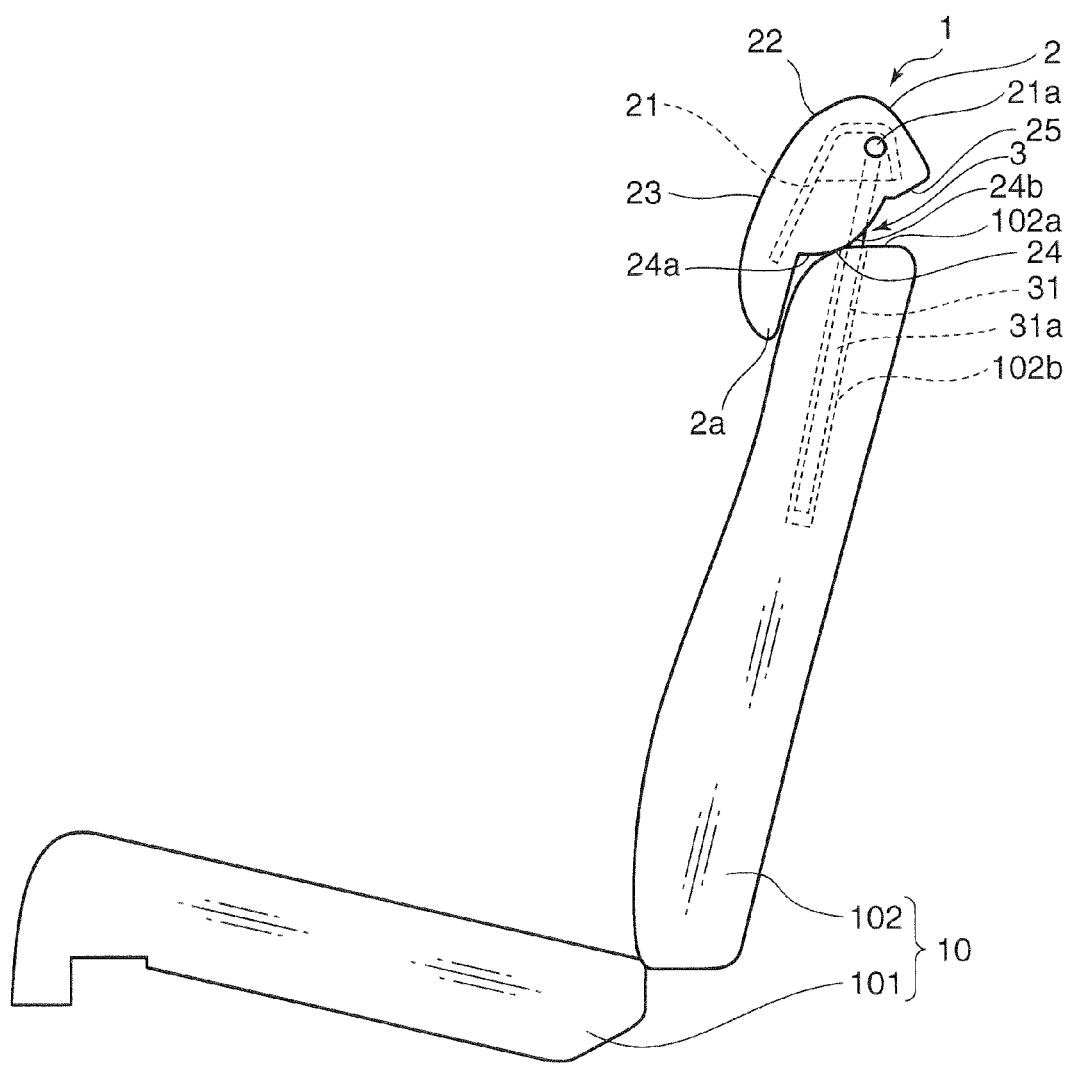
FIG. 3 is a side view of the automobile seat, wherein the headrest is pushed down to a position where an expanded portion thereof is brought into contact with the seat back.

A protruding length of the attachment member 3 protruding upwardly from the upper surface 102a of the seat back 102 can be changed by moving the seat back-mounted portions 31a within the insertion holes 102b in a longitudinal direction thereof. In other words, the headrest body 2 can be moved in a generally upward-downward direction in a range between a lowermost position illustrated in FIG. 4 and an upper position higher than the lowermost position. FIG. 3 shows a state just after the headrest body 2 is moved downwardly from the position in FIG. 2 to a position where it is brought into contact with the seat back 102 while maintaining the posture in FIG. 2.

In this embodiment, the front end 102c of the upper surface 102a of the seat back 102 is formed to extend frontwardly and obliquely downwardly. Further, the headrest body 2 is adapted to be rotated from the position in FIG. 2 where a position of the lower end 2a of the headrest body 2 in the frontward-rearward direction is approximately aligned with a position of the front end 102c of the upper surface 102a of the seat back 102 in the frontward-rearward direction, in a clockwise direction with respect to the attachment member 3 (in left side view). According to this rotation, the lower end 2a of the headrest body 2 can be located frontwardly relative to the front end 102c of the upper surface 102a of the seat back 102.

The expanded portion 24 is configured to be slidingly moved along the upper surface 102a of the seat back 102 during an operation of pushing the headrest body 2 downwardly from the position where the expanded portion 24 is in contact with the upper surface 102a of the seat back 102 (see FIG. 3). Specifically, during the operation of pushing the headrest body 2 downwardly from the position in FIG. 3, the headrest body 2 is rotated about the pivot shaft 21a to allow the lower end 2a of the headrest body 2 to be moved frontwardly, while maintaining a contact between at least a part of a region extending from the lower surface 24a to the rear inclined surface 24b of the expanded portion 24, and a region of the upper surface 102a of the seat back 102 including at least the front end 102c.

Figure 4:
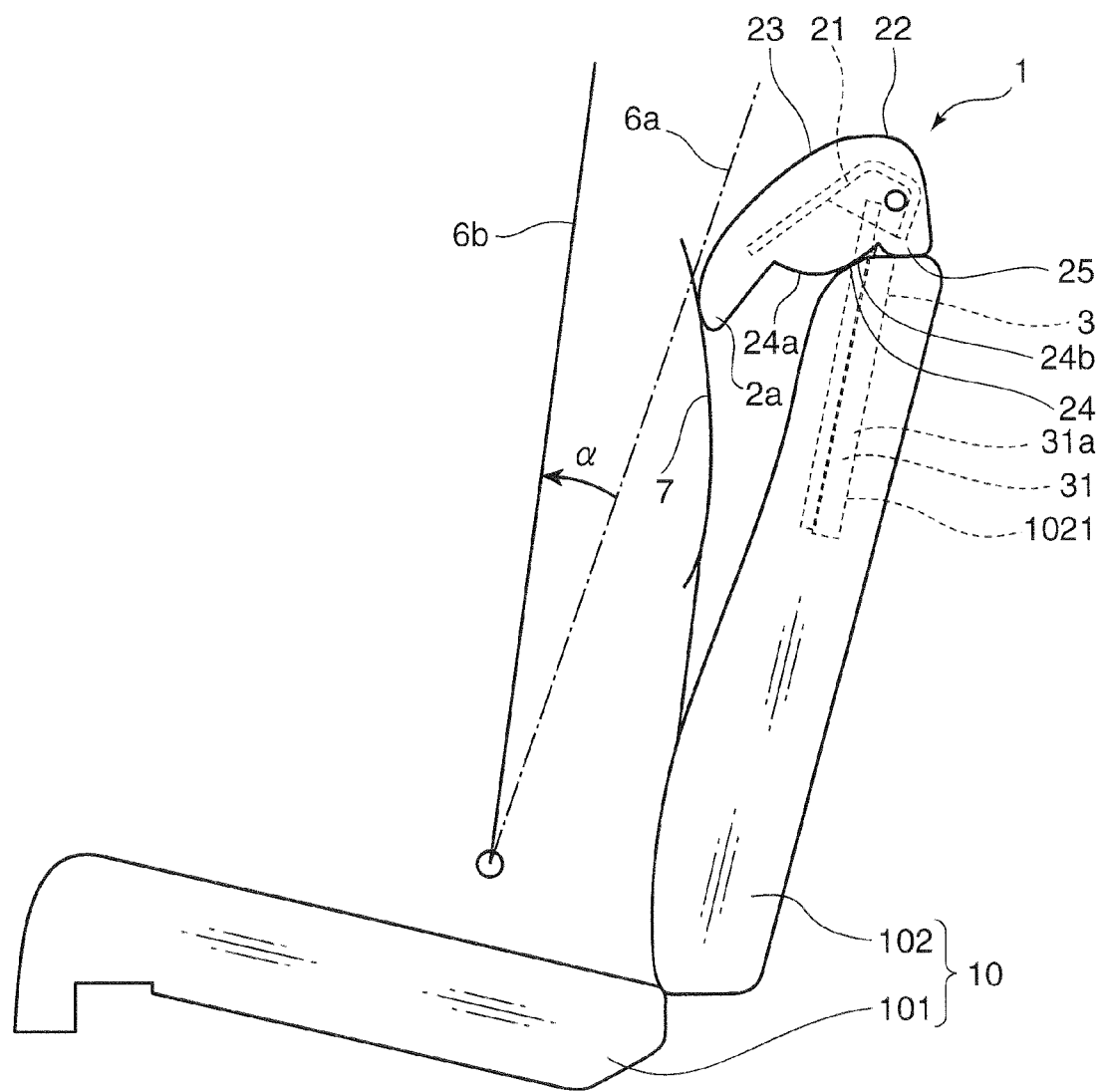
FIG. 4 is a side view of the automobile seat, wherein the headrest is further pushed down from the position in FIG. 3 to a position where a lower end of the expanded portion is rotated frontwardly.

During an operation of pulling the headrest body 2 upwardly from the position in FIG. 4, the expanded portion 24 is moved away from the seat back 102, and the headrest body 2 is rotated by its own weight in such a manner that the lower end 2a thereof is moved rearwardly (in a counterclockwise direction in FIG. 4), and finally returned to the original freely rotatable state illustrated in FIG. 2. Specifically, a position of a gravity center of the headrest body 2 is located frontwardly relative to the pivot shaft 21a to allow the headrest body 2 to be returned to the original position (freely rotatable state) by its own weight.

Although not illustrated, the seat 10 is provided with locking means for locking the headrest 1 at a given position. The locking means is associated with the seat back-mounted portions 31a and the insertion holes 102b, and operable, when the seat back-mounted portions 31a are moved to a certain position within the respective ones of the insertion holes 102b by the operation of pulling or pushing the headrest body 2 upwardly or downwardly, to lock them together at the certain position.

An operation of the headrest 1 according to this embodiment will be described below. For example, as shown in FIG. 2, during an operation of manually pulling the headrest body 2 upwardly, the headrest body 2 is moved to an upper position apart from the seat back 102 in the standing posture. During this operation, the headrest body 2 is returned to the original position (shown in FIG. 2) by its own weight and set to the freely rotatable state. In the upper position, a head of a seated occupant leaning on the seat back 102 is just in contact with the head contact portion 23 of the headrest 1. An actual torso line determined based on the seat 10 and the headrest 1 in the above state conforms to a predefined torso line 6a pre-defined for the seat 10. Thus, the seat occupant can take a comfortable posture.

The term "torso line" represent an axis line of the torso of the seat occupant, specifically, means a direction of a torso bar for measuring an inclination angle of a curve plate modeled from a configuration of a back surface of a torso of a three-dimensional seated human dummy for dimensional measurement in an automobile passenger compartment (3DM-JM 50) defined in JIS (Japanese Industrial Standards) D 4607-1977.

In an operation of lowering the headrest 1, the headrest body 2 is manually pushed downwardly. Through this operation, the seat back-mounted portions 31a are moved downwardly along the respective ones of the insertion holes 102b, and the headrest body 2 is lowered while maintaining the posture thereof.

When the headrest body 2 is lowered, the lower surface 24a of the expanded portion 24 of the headrest body 2 is brought into contact with the upper surface 102a of the seat back 102, as shown in FIG. 3. When the headrest body 2 is further manually pushed downwardly from the position in FIG. 3, the expanded portion 24 is moved while maintaining a contact with the upper surface 102a of the seat back 102.

During this movement, the headrest body 2 is gradually rotated about the pivot shaft 21a of the attachment member 3 in such a manner that the lower end 2a of the headrest body 2 is moved frontwardly to increase a protruding amount thereof from a front surface of the seat back 102. The rotation of the headrest body 2 automatically occurs in conjunction with the operation of pushing the headrest body 2 downwardly. Then, when the rotation stopper portion 25 of the headrest body 2 is brought into contact with the upper surface 102a of the seat back 102, the sliding movement and the rotation of the headrest body 2 are stopped.

When an occupant seated in the seat 10 in the above state, a part of a body of the seated occupant is brought into contact with the lower end 2a of the headrest body 2 before a back surface of the seated occupant is brought into contact with the front surface of the seat back 102. The expanded portion 24 of the headrest body 2 is configured such that an actual torso line 6b line determined based on a contour 7 of a back surface of a torso of the seated occupant in contact with the lower end 2a, i.e., based on the seat 10 and headrest 1 in a state when the headrest 1 is in the lowermost position with respect to the seat back 102 in the standing posture, is raised frontwardly or inclined frontwardly by an angle α relative to the predefined torso line 6a. In this embodiment, the angle α is set to about 20 degrees.

When the lower end 2a of the headrest body 2 protrudes frontward in the above manner, the seated occupant cannot take a comfortable posture due to the impeditive headrest 1. Therefore, the seated occupant is obliged to pull the headrest 1 upwardly in advance of starting the automobile to prevent the headrest 1 from becoming impeditive. This makes it possible to urge the seated occupant to pull the headrest 1 upwardly without leaving the headrest 1 in a lowered position during traveling of the automobile. Thus, this embodiment makes it possible to reduce an undesirable situation where the seat 10 is used under the condition that the headrest 1 is in a lowered position during traveling of the automobile.

In the above embodiment, the expanded portion 24 is configured such that it is slidingly moved along the upper surface 102a of the seat back 102 in conjunction with the operation of pushing the headrest body 2 downwardly. However, the configuration of the expanded portion 24 is not limited thereto, but may be modified on a case-by-case basis.

For example, the expanded portion 24 may be configured such that it is hardly slidably moved along the upper surface 102a of the seat back 102. In this case, a user may manually rotate the headrest body 2 while manually pushing the headrest body 2 downwardly.

In the embodiment, the headrest body 2 is configured such that an actual torso line 6b line based on the seat 10 in a state when the headrest 1 is in the lowermost position is raised or inclined frontwardly by an angle α of about 20 degrees relative to the predefined torso line 6a. However, the configuration of the expanded portion 24 is not limited thereto, but may be modified on a case-by-case basis.

For example, the headrest body 2 may be configured such that the angle α is in the range of 10 to 30 degrees. In cases where the angle α is equal to or greater than 10 degrees, it is possible to reliably urge a seated occupant to pull the headrest 1 upwardly in advance of starting the automobile, while meeting the FMVSS (Federal Motor Vehicle Safety Standards) 202a. If the angle α is greater than 30 degrees, the headrest 1 is increased in size, which is highly likely to cause deterioration in handleability. Thus, it is preferable that the headrest body 2 is configured to allow the angle α to fall within the above range.

Alternatively, the headrest body 2 may be configured such that the headrest body 2 is rotated about the pivot shaft 21a of the attachment member 3 by 60 degree or more, without considering the torso line. More specifically, the headrest body 2 may be configured such that the expanded portion 24 is moved along upper surface 102a of the seat back 102 to cause the headrest body 2 to be rotated about the pivot shaft 21a by 60 degrees or more, for example, when the headrest body 2 is moved downwardly from the position in FIG. 3 to the lowermost position. A range of the rotation angle may be adjusted by adjusting a configuration and/or a size of the rotation stopper portion 25.

In this case, the headrest can meet the requirement "the headrest shall be rotatable by 60 degree or more" specified in the FMVSS 202a, and further a manual operation of rotating the headrest to meet the requirement can be easily performed.

SUMMARY OF THE EMBODIMENT

The above embodiment is summarized as follows.

(1) In the above embodiment, the expanded portion is arranged to be opposed to the upper surface of the seat back, and brought into contact with the upper surface of the seat back when the attachment member is moved downwardly. Further, the expanded portion is formed on the rear portion of the headrest body and configured such that a distance between the surface of the expanded portion and the pivot shaft of the attachment member gradually decreases toward the upper edge of the expanded portion.

In an operation of moving the headrest body downwardly, the expanded portion is brought into contact with the upper surface of the seat back, as described above. Therefore, in order to prevent the expanded portion from disturbing the downward movement, it is necessary to rotate the headrest body to allow the lower end of the headrest body to be moved frontwardly. Thus, when the headrest body is in a lower position, the lower end of the headrest body protrudes frontwardly in an amount greater than that when the headrest body is in an upper position.

In a situation where an occupant is sitting on the seat under a condition that the headrest body is lowered, the seated occupant cannot take a comfortable posture due to contact with the lower end of the headrest body. In this manner, uncomfortable feeling can be given to the seated occupant. Thus, when an occupant is sitting on the seat during traveling of the automobile, it is possible to urge the seat occupant to pull the headrest body upwardly. As above, the headrest according to the above embodiment makes it possible to reduce an undesirable situation where the seated occupant keeps sitting on the seat under a condition that the headrest body is lowered during traveling of the automobile.

In addition, the expanded portion can be formed simply by expanding the headrest body rearwardly. Thus, the headrest can be easily produced at a low cost.

(2) Preferably, the expanded portion is configured such that an actual torso line based on the seat and the lower end of the headrest body in a lowermost position is inclined or raised frontwardly by 10 degrees or more relative to a predefined torso line pre-defined based on the seat and the headrest body in an upper position above the seat back.

In this case, it is possible to reliably urge a seated occupant to pull the headrest body upwardly during traveling of the automobile, and further reduce the undesirable situation where the seated occupant keeps sitting on the seat under a condition that the headrest body is lowered during traveling of the automobile.

In addition, the headrest can meet the requirement "a torso line during retraction of a headrest shall be raised by 10 degrees or more relative to a design standard (predefined) torso line during seating of an occupant" specified in the FMVSS 202a, and further a manual operation of rotating the headrest to meet the requirement can be easily performed.

This application is based on Japanese Patent Application Serial No. 2009-071896, filed in Japan Patent Office on Mar. 24, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A headrest to be attached to a seat back of a seat for an automobile, comprising:
    a headrest body; and
    an attachment member adapted to be attached to the seat back to allow the headrest body to be moved in an upward-downward direction with respect to the seat back when the seat back is in a standing posture while allowing the headrest body to be rotated about a pivot shaft so as to move a lower end of the headrest body in a frontward-rearward direction of the automobile,
    wherein the headrest body has an expanded portion formed on a rear portion thereof to expand rearwardly, the expanded portion being formed in a shape so that a distance between a surface of the expanded portion and the pivot shaft gradually decreases toward an upper edge of the expanded portion, the expanded portion including a lower surface and a rear inclined surface extending from the lower surface while curving rearwardly and upwardly,
    wherein the expanded portion is arranged to be opposed to an upper surface of the seat back when the seat back is in the standing posture, and a contact position between the expanded portion and the seatback is frontward of the pivot shaft when the seat back is in the standing posture,
    and wherein the headrest body is configured to be rotated so that a lower end of the headrest body is moved frontward due to a contact between at least a part of a region extending from the lower surface to the rear inclined surface of the expanded portion and a region including at least a front end of the upper surface of the seat back in a position frontward of the pivot shaft during an operation of pushing the headrest body downwardly in the standing posture of the seat back.

2. The headrest as defined in claim 1, wherein the expanded portion is configured such that an actual torso line based on the seat and the lower end of the headrest body in a lowermost position is inclined or raised frontwardly by 10 degrees or more relative to a predefined torso line pre-defined based on the seat and the headrest body in an upper position above the seat back.

3. The headrest as defined in claim 1, wherein the headrest body has a head contact portion at a front portion of the headrest body and forward of the attachment member and a rotation stopper at a rear portion of the headrest body, the expanded portion having a convexly curved outer surface extending between a rear part of the head contact portion and a front part of the rotation stopper.

4. The headrest as defined in claim 3, wherein a contact position between the expanded portion and the seat back is frontward of the pivot shaft when the seat back is in the standing posture.

5. A seat for an automobile, comprising:
    a seat cushion;
    a seat back rotatably coupled to the seat cushion; and
    a headrest attached to the seat back, wherein the headrest includes;
    a headrest body, and
    an attachment member attached to the seat back to allow the headrest body to be moved in an upward-downward direction with respect to the seat back when the seat back is in a standing posture while allowing the headrest body to be rotated about a pivot shaft so as to move a lower end of the headrest body in a frontward-rearward direction of the automobile,
    wherein the headrest body has an expanded portion formed on a rear portion thereof to expand rearwardly, the expanded portion being formed in a shape so that a distance between a surface of the expanded portion and the pivot shaft gradually decreases toward an upper edge of the expanded portion, the expanded portion including a lower surface and a rear inclined surface extending from the lower surface while curving rearwardly and upwardly,
    wherein the expanded portion is arranged to be opposed to an upper surface of the seat back when the seat back is in the standing posture, and a contact position between the expanded portion and the seatback is frontward of the pivot shaft when the seat back is in the standing posture,
    and wherein the headrest body is configured to be rotated so that a lower end of the headrest body moved frontward due to a contact between at least a part of a region extending from the lower surface to the rear inclined surface of the expanded portion and a region including at least a front end of the upper surface of the seat back in a position frontward of the pivot shaft during an operation of pushing the headrest body downwardly in the standing posture of the seat back.

6. The seat as defined in claim 5, wherein the expanded portion is configured such that an actual torso line based on the seat and the lower end of the headrest body in a lowermost position is inclined or raised frontwardly by 10 degrees or more relative to a predefined torso line pre-defined based on the seat and the headrest body in an upper position above the seat back.

7. The seat as defined in claim 5, wherein the headrest body has a head contact portion at a front portion of the headrest body and forward of the attachment member and a rotation stopper at a rear portion of the headrest body, the expanded portion having a convexly curved outer surface extending between a rear part of the head contact portion and a front part of the rotation stopper.

8. The seat as defined in claim 7, wherein a contact position between the expanded portion and the seat back is frontward of the pivot shaft when the seat back is in the standing posture.

\* \* \* \* \*